United States Patent [19]

Eckes et al.

[11] Patent Number: 4,758,475

[45] Date of Patent: Jul. 19, 1988

[54] ISOCYANATE-FREE POLYURETHANE DISPERSIONS

[75] Inventors: Helmut Eckes, Eppstein/Taunus; Dieter Engel, Kelsterbach, both of Fed. Rep. of Germany

[73] Assignee: Hoechst AG, Fed. Rep. of Germany

[21] Appl. No.: 943,625

[22] Filed: Dec. 18, 1986

[30] Foreign Application Priority Data

Dec. 20, 1985 [DE] Fed. Rep. of Germany ....... 3545195

[51] Int. Cl.$^4$ ............................................. C08G 71/04
[52] U.S. Cl. ............................... 428/423.1; 428/425.1; 428/425.6; 428/425.8; 428/423.4; 428/413; 428/417; 428/418; 428/524; 524/877; 525/509; 525/515; 528/232; 528/233; 528/243; 528/266; 528/269
[58] Field of Search ............... 428/423.1, 425.1, 425.6, 428/425.8, 423.4, 413, 417, 418, 524; 524/877; 525/509, 515; 528/232, 233, 243, 269, 266

[56] References Cited

U.S. PATENT DOCUMENTS

| | | | |
|---|---|---|---|
| 4,147,679 | 4/1979 | Scriven et al. | 524/839 |
| 4,308,184 | 12/1981 | Thoma et al. | 524/233 |
| 4,331,717 | 5/1982 | Wenzel et al. | 524/591 |
| 4,361,594 | 11/1982 | Winterbottom | 525/509 |

*Primary Examiner*—John Knight
*Assistant Examiner*—S. A. Acquah
*Attorney, Agent, or Firm*—Bierman and Muserlian

[57] ABSTRACT

Polyurethane dispersions based on reaction products from (A) bismethylolated urethanes having at least 2 urethane groups and (B) polyhydroxyl compounds which contain groups which are capable of ion formation, these groups being present in neutralized form, and a process for the preparation thereof. The use of the dispersions for the surface-coating of metal, plastics, glass, leather and paper.

10 Claims, No Drawings

ISOCYANATE-FREE POLYURETHANE DISPERSIONS

The invention relates to isocyanate-free polyurethane dispersions, and to a new process for the preparation of polyurethanes via an intermediate stage of oligomeric polyurethane pre-adducts which contain hydrophilic groups which ensure the dispersibility of the oligomers in water.

Dispersions known hitherto are prepared by various methods, which are described, for example, in D. Dieterich and H. Reiff, Angewandte makromolekulare Chemie, 26, 85 (1972). According to the citation, either the solution of a polyurethane in an organic solvent is converted into an aqueous dispersion or a liquid pre-polymer with or without solvent is dispersed in water. A liquid, NCO group-containing pre-polymer can be introduced, for example, into water with vigorous stirring, an emulsion of the pre-polymer being produced initially which further reacts, by chain extension, with water or a di- or polyamine to form high molecular weight polyurethane urea.

An isocyanate group-containing component, usually a diisocyanate, is necessary for carrying out this synthesis.

Isocyanates are compounds which are expensive to prepare, toxic and difficult to handle. It was thus desirable to prepare aqueous polyurethane dispersions without using isocyanate components.

The invention relates to polyurethane dispersions based on reaction products of (A) bismethylolated urethanes having at least two urethane groups and (B) polyhydroxyl compounds which contain groups which are capable of forming ions, these groups being present in neutralized form. The invention also relates to a process for the preparation of the polyurethane dispersions, and to their use. The advantages of the process according to the invention are the preparation of polyurethane dispersions avoiding the use of isocyanates, and thus the use of inexpensive, non-toxic, easy-to-handle components, and furthermore the possibility exists of incorporating additional free OH groups in order to achieve good crosslinkability, for example using epoxide or melamine resins. For the neutralization in the preparation of the dispersions according to the invention, ammonia or aminoalcohols can also be used, the use of which is prevented, as is the presence of free OH groups, in the known isocyanate-containing polyurethane dispersions prepared via chain extension.

Suitable methylolated urethanes (A) are known. They are prepared in a multistage synthesis by reaction of alkylurethanes, having 1 to 12, preferably 2 to 5, carbon atoms in the alkyl group, prepared by reaction of appropriate monoalcohols and urea, for example butylurethane, with polyhydroxyl-functional components in a first stage and subsequent reaction of the urethane groups formed with formaldehyde in a second stage to form corresponding methylol compounds. The reaction in the first stage is carried out at temperatures of 100° to 160° C. in the presence of transesterification catalysts, for example titanium alcoholates. During this, the alkyl groups contained in the alkylurethanes are cleaved off and removed by distillation, generally under reduced pressure, in the form of monoalcohols. In the reaction in the first stage, intermediates which already contain urethane groups and which do not take part in the reaction between the alkylurethanes and the polyhydroxyl-functional components, for example urethanized polyesters, may also be present. Likewise, the reaction of urea with the polyhydroxyl-functional components may also be carried out to form the bisurethanes directly.

In the reaction of the bisurethanes to form the methylolated products, the starting compounds are mixed with paraformaldehyde or an aqueous solution of formaldehyde in a slurry, and the reaction is initiated by warming to 50° to 150° C. in the presence of bases as catalysts (for example carbonate, methylate or hydroxide). The progress of the reaction can be seen clearly by a homogenization of the reaction mixture. The reaction with paraformaldehyde in the melt is likewise possible.

As polyhydroxyl-functional components, diols may be employed, such as ethylene glycol, the various propylene and butylene glycols, neopentyl glycol, hexanediol and the like, furthermore polyglycol ethers, such as diethylene glycol, triethylene glycol, OH group-terminated polyesters having molecular weights of 200 to 10,000, which are again constructed from the compounds which are customary in polyester chemistry, for example adipic acid, terephthalic acid, isophthalic acid, maleic acid, and anhydrides thereof, the abovementioned dihydric and higherhydric alcohols such as trimethylolpropane, glycerol, pentaerythrite, sugar derivatives or mixtures thereof, or alcohol ethers, polytetrahydrofurans, polycaprolactams and polycaprolactones, polybutadienols, and OH-functional acrylates.

The bismethylolurethanes thus obtained are reacted, according to the invention, if appropriate also using the one-pot process, with polyhydroxyl compounds B), which are capable of forming ions, at 100° to 160°, preferably 120° to 150° C. in the melt. Compounds which are capable of forming ions are, for example, dihydroxycarboxylic acids such as 2,2-bishydroxymethylacetic acid, 2,2-bishydroxymethylpropionic acid, tartaric acid, dihydroxybenzoic acid, and the like. To prepare cationic dispersions, alkanolamines having up to 20, preferably up to 10, carbon atoms, such as diethanolamine, triethanolamine and N-methyldiisopropanolamine, are incorporated. During this, ether groups are produced, always with the elimination of water, and the progress of the reaction can be followed by means of the amount of water eliminated. In this stage, further components which are capable of polyetherification can be incorporated, for example diols and OH group-containing polyesters.

After this polyetherification reaction, the groups which are capable of forming ions, for example carboxyl groups, sulfonic acid and phosphoric acid groups, amino groups which are capable of quaternization, sulfur groups and phosphorus groups are converted into ionic groups by neutralization in the presence of solvent.

Water- and polymer-compatible solvents are added to the dispersion solid produced in this fashion, which is neutralized by addition of suitable salt-forming reagents. If the groups which are capable of anion formation are incorporated in the polyether molecule, alkali, ammonia, amines or aminoalcohols are added, whereas if N atoms (or S or P atoms) are in the polyether molecule, acids and quaternization reagents, such as hydrochloric acid, acetic acid, phosphoric acid, dimethyl sulfate and methyl bromide, are used. If appropriate, the addition of solvent to the batch can wait until after the neutralization. Suitable solvents are water-miscible ethers, alcohols, ether alcohols, ketones, esters, N-methylpyrrolidone and dimethylformamide.

The resulting mixture is subsequently converted, by the addition of water, into a colloidal dispersion in the presence of solvents with gentle warming and stirring.

The dispersions prepared can be applied by known application methods, such as by knife-coating, spraying, dipping or electrophoretically, and dried after the application in a thin coating to form tough and resilient films having good adhesion to many substrates, such as glass, plastic, metal, leather, paper and the like, a high drying rate being achieved, even at low temperatures In the following examples, P is always parts by weight and percentage data are always percent by weight.

EXAMPLES

Bisurethane preparation (1) 514 P of butyl urethane and 236 P of hexane-1,6-diol were mixed, melted, and dehydrated at 100° C. under reduced pressure. After 30 minutes, 1% of butyl titanate was added, and the temperature was increased to 140° C. The butanol produced during the transesterification was removed from the batch by reduced pressure (100 to 150 Torr), the receiver being cooled using ice. The degree of conversion was determined by checking the amount of distillate. The resulting bisurethane was deposited as a precipitate. The precipitate was slurried with toluene/ethanol 1:1, filtered off under suction, and washed repeatedly with methanol in order to remove butyl urethane and hexanediol residues from the batch, and the purified product was dried at room temperature under reduced pressure. Yield 292 P of hexylidene-1,6-bisurethane, melting point: 203°–207° C. Amount of distillate 380 P.

(2) 600 P of a linear, OH group-containing polyester, comprising 1 mole of adipic acid, 3 moles of isophthalic acid and 4.8 moles of hexane-1,6-diol (acid number 7, OH number 72), and 81 P of perhydrobisphenol A were mixed with 274 P of butyl urethane and reacted analogously to Example 1. The reaction was continued until butanol no longer distilled off (about 15 hours). Purification as in Example 1 was not necessary, since the resulting urethane was produced as a homogeneous melt. Yield 890 P of a product of a waxy nature, amount of distillate 156 P.

Etherification (3) 204 P of hexylidene-1,6-bisurethane, obtained according to Example 1, and 60 P of paraformaldehyde (91% purity) were mixed with 1.3 P of sodium carbonate and warmed to 110° C. Due to the reaction starting during this, the mixture began to melt and had reacted completely after about one hour. 19 P of 2,2-bishydroxymethylpropionic acid were added to the homogeneous melt, the mixture was warmed to 130° C., and maintained at this temperature until the water of reaction no longer distilled off. Yield 253 P of a product of a waxy nature, acid number 26, distillate 15 P.

(4) 500 P of the urethanization product prepared according to Example 2, 9.4 P of paraformaldehyde (91% purity) and 1.6 P of sodium carbonate were reacted as in Example 3. After the reaction had ended, 38.7 P of 2,2-bishydroxypropylpropionic acid were added. Yield 560 P, acid number 22, distillate 12 P.

Preparation of a dispersion (5) 300 P of intermediate according to Example 3 and 100 P of N-methyl-2-pyrrolidone were homogenized, and a solution of 20 P of triethylamine and 580 P of water were added, with rapid stirring. A colloidal dispersion with a solids proportion of about 30% was produced.

(6) 300 P of intermediate according to Example 4 and 100 P of ethanol were homogenized and mixed with a solution of 20 P of triethylamine and 580 P of water, with thorough stirring. An approximately 30% colloidal dispersion was produced.

(7) 780 P of an OH group-containing polyester (from 1 mole of adipic acid, 1 mole of terephthalic acid, 2 moles of isophthalic acid and 4.8 moles of hexane-1,6-diol, acid number 8, OH number 75) and 122 P of n-butyl urethane were heated to 100° C. The resultant homogeneous melt was freed of residual moisture under reduced pressure in the course of 1 hour. 9 P of tetraisopropyl titanate were then added, and the batch was heated to 140° C. and maintained at this temperature under reduced pressure for 8 hours under the conditions of a moderate distillation. A further 9 P of tetraisopropyl titanate were subsequently added and the reaction was continued under reduced pressure for a further 8 hours. Yield 64 P of distillate (principally n-butanol) and 842 P of urethanized polyester.

(8) 500 P of the urethanized polyester described in Example 7 were warmed to 110° C. 12.5 P of paraformaldehyde (91% purity) and 1.5 P of sodium carbonate were added to the resultant melt and the batch was maintained at 110° C. for 2 hours. 80 P of 2,2-bishydroxymethylpropionic acid were subsequently added and the mixture was warmed to 140° C. After a reaction time of 2 hours at 140° C., the batch was left for a further hour under reduced pressure. Yield 522 P of polyester urethane, acid number 39.

(9) 522 P of the polyester urethane obtained in Example 8 were dissolved in 435 P of ethanol at 50° to 70° C. After cooling, 56 P of triethylamine were added and the mixture was stirred. This mixture was introduced, with thorough stirring, into 728 P of water, a colloidal dispersion being produced.

(10) 770 P of a polyester (from 1 mole of adipic acid, 3 moles of isophthalic acid, 3.8 moles of hexane-1,6-diol and 1 mole of neopentyl glycol, acid number 7, OH number 70), 133 P of butyl urethane and two batches of 9 P of tetraisopropyl titanate were treated as in Example 7. Yield 820 P of urethanized polyester, distillate 59 P of butanol.

(11) 500 P of the reaction product according to Example 10, 18.5 P of paraformaldehyde (91% purity), 1.5 P of sodium carbonate and 80 P of 2,2-bishydroxymethylpropionic acid were reacted with one another as in Example 8. Yield 525 P of polyester urethane, acid number 41.5.

(12) 515 P of polyester urethane according to Example 11, 429 P of ethanol, 57 P of triethylamine and 718 P of water were processed analogously to Example 9 to form a colloidal dispersion with a solids proportion of 30%.

(13) 330 P of polyester urethane from Example 7, 86 P of perhydrobisphenol A, 84 P of butyl urethane and 5 P of tetraisopropyl titanate were reacted as described in Example 7. Yield 450 P of a mixture of urethanized intermediates.

(14) 450 P of the intermediate according to Example 13, 32.6 P of paraformaldehyde (91% purity), 1.6 P of sodium carbonate and 74.7 P of 2,2-bishydroxymethylpropionic acid were reacted as described in Example 8. Yield 526 P of polyester urethane, acid number 48.

(15) 526 P of polyester urethane according to Example 14, 438 P of ethanol, 68 P of triethylamine and 721 P of water were processed as in Example 9 to form a colloidal dispersion with a solids content of 30%.

(16) 300 P of polyester urethane from Example 8, 77 P of perhydrobisphenol A, 76 P of butyl urethane and 5 P of tetraisopropyl titanate were reacted as in Example 7. Yield 417 P.

(17) 417 P of polyester urethane according to Example 16, 30.6 P of paraformaldehyde (91% purity), 1.5 P of sodium carbonate and 67.7 P of 2,2-bishydroxymethylpropionic acid were reacted as in Example 8. Yield 487 P of polyester urethane.

(18) 487 P of polyester urethane according to Example 17, 405 P of ethanol, 64.4 P of triethylamine and 666 P of water were reacted analogously to Example 9 to form a colloidal dispersion of solids proportion 30%.

We claim:

1. A polyurethane dispersion containing reaction products from (A) bismethylolated urethanes having at least two urethane groups, and (B) polyhydroxyl compounds which contain groups which are capable of ion formation, these groups being present in neutralized form.

2. A process for the preparation of polyurethane dispersions as claimed in claim 1, wherein (A) bismethylolated urethanes having at least two urethane groups are reacted with (B) polyhydroxyl compounds which contain groups which are capable of ion formation, at 100° to 160° C. in the melt, the resultant reaction product is neutralized, mixed with a water-compatible solvent, optionally the solvent being added before the neutralization, and converted to a dispersion by addition of water.

3. The embodiment as claimed in claim 2, wherein dihydroxycarboxylic acids or alkanolamines of up to 20 carbon atoms are employed as polyhydroxyl compounds.

4. The embodiment as claimed in claim 2, wherein further polyhydroxyl compounds which are not capable of ion formation are employed together with the component (B).

5. The embodiment as claimed in claim 4, wherein diols or OH group-containing polyesters having molecular weights of 200 to 10,000 are employed.

6. The embodiment as claimed in claim 2, wherein alkali metal hydroxides, alkali metal carbonates, ammonia, amines, amino alcohols or acids and compounds which cause quaternization are employed for the neutralization.

7. Metal, plastics, glass, leather or paper having a surface coating based on dispersons as claimed in claim 1.

8. Metal, plastics, glass, leather or paper having a surface coating based on the dispersions as claimed in claim 1 as a mixture with epoxide or melamine resins.

9. A surface coating for metal, plastic, glass, leather and paper containing a polyurethane dispersion of claim 1.

10. A coating of claim 9, wherein the dispersions are admixed with an epoxide or melamine resin.

* * * * *